F. V. GROSS.
TATTING IMPLEMENT.
APPLICATION FILED FEB. 23, 1916.
1,187,306.
Patented June 13, 1916.
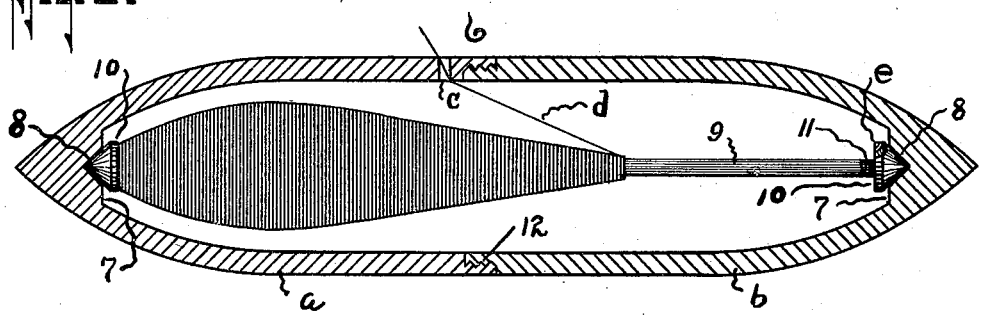
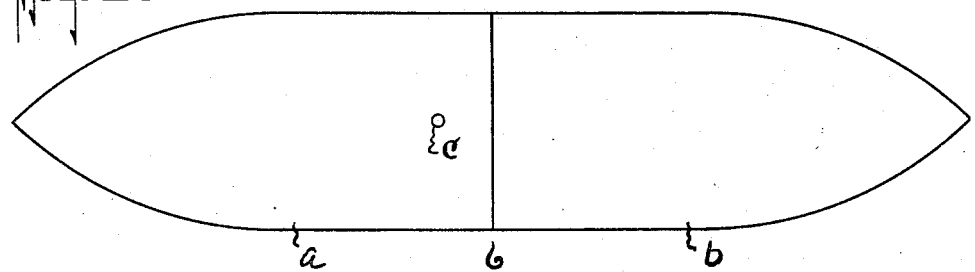
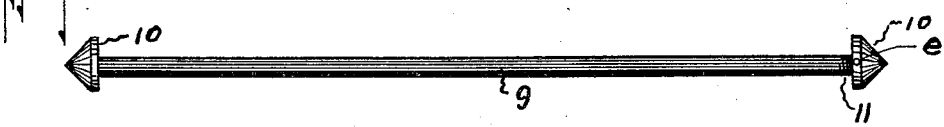
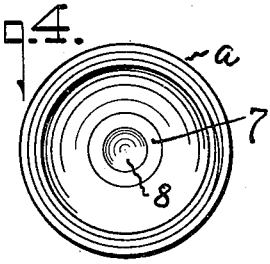
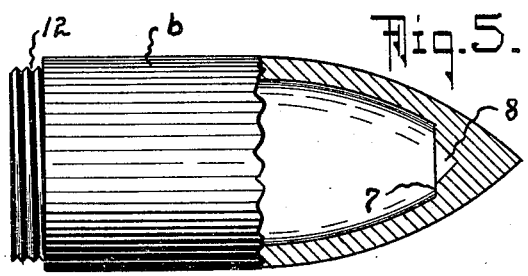
Witnesses
Jane Knock
Hiram A. Sturges
Inventor
Frank V. Gross
By Arthur H. Sturges
Attorney

UNITED STATES PATENT OFFICE.

FRANK V. GROSS, OF OMAHA, NEBRASKA, ASSIGNOR OF ONE-HALF TO FRANK CHRISTMAN, OF OMAHA, NEBRASKA.

TATTING IMPLEMENT.

1,187,306.

Specification of Letters Patent. Patented June 13, 1916.

Application filed February 23, 1916. Serial No. 79,944.

*To all whom it may concern:*

Be it known that I, FRANK V. GROSS, a citizen of the United States, residing at Omaha, in the county of Douglas and State of Nebraska, have invented certain new and useful Improvements in Tatting Implements, of which the following is a specification.

This invention relates to an improvement in tatting implements and has for its principal object to provide a device which will be convenient, durable and effective in use.

The invention includes the provision of a two-part, cylindrical receptacle divided transversely and threaded at its middle for the purpose of opening and closing, the two cylindrical parts being tapered toward their outer ends and each being provided interiorly, near its convergent end with a facet having a conical recess formed therein, in line with its axis for receiving a head of the spool or bobbin, the bobbin being longitudinally adjustable for suitable bearings of its conical heads in the recesses, the particular bearings being for the purpose of eliminating friction as far as possible and for use in adjusting tension.

The invention consists of the novel construction, combination and arrangement of parts as described herein and claimed, and as illustrated in the accompanying drawing, wherein—

Figure 1 is a view in longitudinal section of the tatting implement, the bobbin or spool being partly unwound. Fig. 2 is a plan view of the same. Fig. 3 is a side view of the bobbin. Fig. 4 is a view of the inner end of one of the half-portions of the shuttle. Fig. 5 is a side view, partly broken away and in section, of one of the half-portions of the shuttle.

Referring now to the drawing for a more particular description, the tatting implement consists, in part, of a bifurcated receptacle 6, the two half-portions *a* and *b* being similar in form and proportion.

Numerals 7 indicate facets which are disposed at right angles to the respective axes of the half-portions, and centrally of each facet is provided a conical recess 8.

Numeral 9 indicates the spindle of a spool or bobbin, provided at its ends with cone-shaped heads 10 adapted to have bearings and to practically fill the recesses 8, the bobbin being longitudinally adjustable since the mounting of one of the heads 8 is threaded on the spindle as indicated at 11.

The member *b* is threaded at its open end as indicated at 12, and the member *a* is also threaded at its open end whereby the two parts of the receptacle may be connected at their inner ends or readily disconnected, as may be required. An aperture *c* is provided in one of these parts, near the middle of the device, for permitting the thread *d* to be withdrawn, and an aperture *e* is provided in one of the bearing heads for use when the thread is wound upon the spindle.

As thus described, the members *a* and *b* may be considered as separate, cylindrical receptacles having threaded parts at their inner, open ends for coöperation in connecting them to provide the complete shuttle with tapered end portions, substantially as shown.

Having described construction, a further explanation relating to operation is not necessary, except to state that the particular shape of the receptacle facilitates the work of making tatting, the parts preferably being manufactured of aluminum to avoid undue weight. While the spindle may be so adjusted that it will rotate without appreciable friction, in some instances it is desirable to prevent a free rotation of this member, and therefore the means for adjusting the bearings of the heads in the recesses, as mentioned, are provided. The function provided by the facets is simply to facilitate the formation of the recesses in a manner to provide uniformity for the bearing surfaces of the coneshaped heads. If the recesses become worn the spindle may be adjusted so that the bearings for the heads will be correct.

What I claim as my invention and desire to secure by Letters Patent is,—

In a tatting implement, a pair of cylindrical receptacles provided with coöperating fastening devices at their open ends and disposed end to end with their fastening devices in engagement, each of said receptacles being formed with a tapered end portion and provided interiorly adjacent to its tapered portion with an annular facet disposed at right angles to its longitudinal axis and a conical recess opening on said facet in line with said axis, one of said receptacles being provided near its open end with an aperture, a spindle disposed axially of the receptacles provided with terminal cone shaped bearing heads for engagement in said recesses, one of the cone shaped bearing heads being adjustable longitudinally of the spindle.

In testimony whereof, I have affixed my signature in presence of two witnesses.

FRANK V. GROSS.

Witnesses :
   ARTHUR H. STURGES,
   HIRAM A. STURGES.

Copies of this patent may be obtained for five cents each, by addressing the "Commissioner of Patents, Washington, D. C."